United States Patent [19]
Lee et al.

[11] Patent Number: 6,088,011
[45] Date of Patent: Jul. 11, 2000

[54] COLOR PLASMA DISPLAY PANEL

[75] Inventors: Chun Woo Lee; Min Chol Kim, both of Gumi; Gun Mu Her, Busan, all of Rep. of Korea

[73] Assignee: Orion Electric Co., Ltd., Gumi-si, Rep. of Korea

[21] Appl. No.: 09/043,532

[22] PCT Filed: Sep. 21, 1995

[86] PCT No.: PCT/KR95/00126

§ 371 Date: Mar. 20, 1998

§ 102(e) Date: Mar. 20, 1998

[87] PCT Pub. No.: WO97/11477

PCT Pub. Date: Mar. 27, 1997

[51] Int. Cl.[7] .................................................. G09G 3/28
[52] U.S. Cl. ............................ 345/60; 345/72; 345/152
[58] Field of Search .................................. 345/60, 62, 63, 345/67, 72, 74, 75, 88, 43, 152, 149; 315/169.4, 169.1; 313/293, 296, 298, 301

[56] References Cited

U.S. PATENT DOCUMENTS

| | | | |
|---|---|---|---|
| 3,873,870 | 3/1975 | Fukushima et al. | 345/152 |
| 3,882,342 | 5/1975 | Kamegaya et al. | |
| 4,162,427 | 7/1979 | Kamegaya et al. | 345/72 |
| 4,513,281 | 4/1985 | Ngo | 345/72 |

FOREIGN PATENT DOCUMENTS 0 389 031 A1   9/1990   European Pat. Off. .

OTHER PUBLICATIONS

Patent Abstract of Japan, vol. 18, No. 3 (E–1485), 1994, JP 2–250995 A; (Mitsubishi) Sep. 28, 1993, abstract.

*Primary Examiner*—Xiao Wu
*Attorney, Agent, or Firm*—Jacobson, Price, Holman & Stern, PLLC

[57] ABSTRACT

A color plasma display panel including a pixel matrix array (R, G, B) in which discharge cells of the red (R), green (G) and blue (B) are grouped to constitute a pixel, wherein the pixel includes a blue discharge cell (B) having a height smaller than the entire height of the pixel and width equal to entire width of the pixel (R, G, B), and red and green discharge cells laterally aligned with each other, each of the red and green discharge cells having a height corresponding to a difference between the entire height of the pixel and the height of the blue discharge cell (B) and a width less than ½ the entire width of the pixel. The pixel further includes an assistant cell (M) disposed between the red and green discharge cells and priming holes (H) respectively provided at partition walls each disposed between each of the red (R) and green (G) discharge cells and the assistant cell (M). In this color plasma display panel structure, it is possible to easily adjust a luminance difference among three kinds of discharge cells, thereby achieving improvements in white balance and luminance.

3 Claims, 3 Drawing Sheets

COLOR PLASMA DISPLAY PANEL

TECHNICAL FIELD

The present invention relates to color plasma display.

BACKGROUND ART

Since plasma display panels (PDP's), which are a typical one of discharge type display devices, have several superior characteristics as a flat plate type display device, their application has become more wide. Recently, development of color PDP's for wall tapestry televisions or portable terminals has become more active. For the sequential scanning system, such color PDP's take a short selecting enable time as compared to monochrome PDP's. The selecting enable time in color PDP's corresponds to about ⅓ that of monochrome PDP's. For this reason, research on color PDP's is being primarily concentrated on an improvement in luminance.

FIG. 1 illustrates a conventional color PDP having a quadrant-cell matrix structure.

In this PDP structure, four discharge cells R, B, B and G are grouped into a pixel by partitions V. The PDP includes one assistant electrode C per two anodes A. The assistant electrode C serves to supply priming charge to discharge cells R, G and B arranged on both sides thereof, thereby enabling a rapid primary discharge. Accordingly, it is possible to decrease the drive voltage and to extend the continued discharge time, thereby achieving an improvement in luminance.

Generally, each pixel includes two blue discharge cells B because blue fluorescent material exhibits a lower luminance than red or green fluorescent material. For this reason, it is very difficult to satisfy the white balance on the entire screen. Furthermore, the provision of the assistant electrode C results in an increase in electrode density on the substrate. As a result, it is difficult to provide a high definition display device.

DISCLOSURE OF INVENTION

Therefore, an object of the invention is to solve the above-mentioned problems encountered in the prior art and to provide a color PDP capable of easily satisfying the white balance and yet having a simple structure.

In accordance with the present invention, this object is accomplished by providing a color plasma display panel including a pixel matrix array in which discharge cells of three colors, namely, red, green and blue, are grouped to constitute a pixel, wherein the pixel comprises: a first discharge cell adapted to emit light with one of the three colors, the first discharge cell having a height smaller than the entire height of the pixel and a width equal to the entire width of the pixel; and a pair of laterally arranged second discharge cells respectively adapted to emit light with the remaining two of the three colors, each of the second discharge cells having a height corresponding to a difference between the entire height of the pixel and the height of the first discharge cell and a width less than the entire width of the pixel.

BRIEF DESCRIPTION OF THE DRAWINGS

Other objects and aspects of the invention will become apparent from the following description of embodiments with reference to the accompanying drawings in which.

BEST MODE FOR CARRYING OUT THE INVENTION

Figure 1:
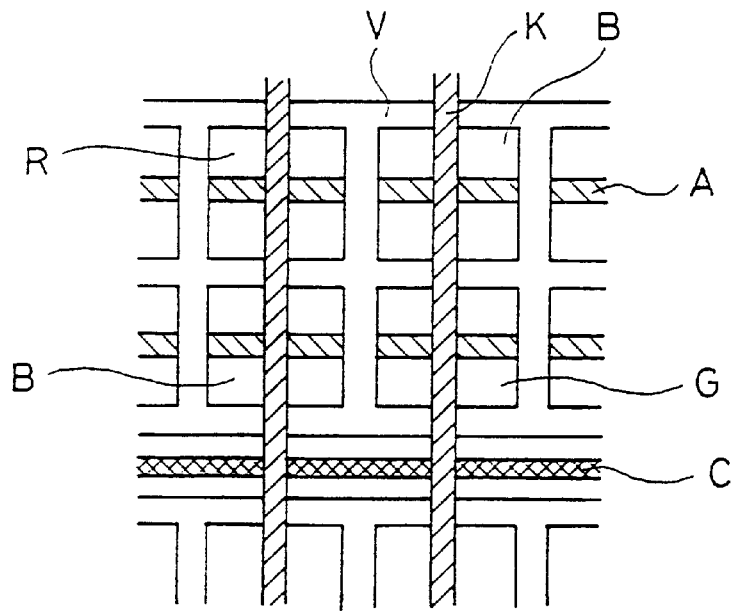
FIG. 1 is a plan view illustrating a conventional color PDP.
Figure 2:
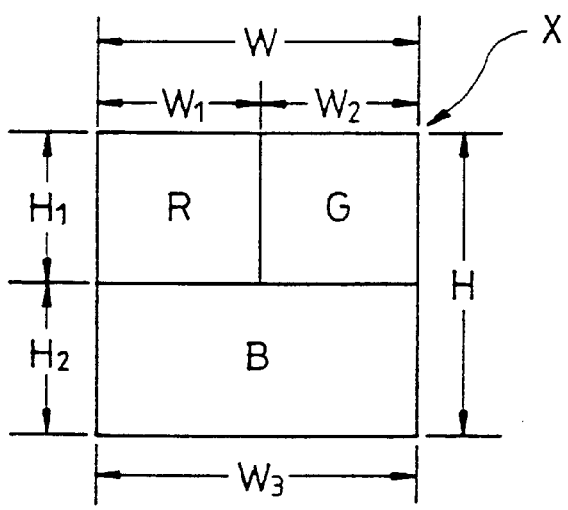
FIG. 2 is a schematic view illustrating one pixel of a color PDP in accordance with the present invention.

FIG. 2 illustrates one pixel of a color PDP in accordance with the present invention. As shown in FIG. 2, the pixel is constituted by three discharge cells R, G and B. The blue cell B exhibiting a low luminance has a width $W_2$ corresponding to the entire width W of the pixel X and a height $H_2$ smaller than the entire height H of the pixel X. On the other hand, red and green discharge cells R and G have a height $H_1$ corresponding to a length obtained after deducting the height $H_2$ of the blue discharge cell B from the entire height H of the pixel X. The red and green discharge cells R and G also have widths $W_1$ and $W_2$ respectively divided from the entire width W of the pixel X. In case an assistant cell M is disposed between the red and green discharge cells R and G, it is preferred that the sum of widths $W_1$ and $W_2$ and the width of the assistant cell M is equal to the entire width W of the pixel X.

As the discharge cells R, G and B are divided in each pixel X in a manner as mentioned above, it is possible to easily adjust the luminance difference. In other words, the area ratio of the blue discharge cell B to the green or red discharge cell G or R can be controlled by adjusting the height $H_2$ of the blue discharge cell B with respect to the entire pixel height H. The area ratio between green and red discharge cells G and R can be controlled by adjusting the widths $W_1$ and $W_2$. Where general fluorescent materials are used, it is preferred that areas of the green and red discharge cells G and R are substantially equal to each other. In this case, it is also preferred that the blue discharge cell B has an area corresponding to 1.5 or 2 times the area of the green or red discharge cell G or R. As the area of each discharge cell is controlled as mentioned above, the light-emitting area of the discharge cell can be adjusted. Accordingly, the white balance can be easily controlled.

A preferred embodiment of the color PDP in accordance with the present invention will now be described in conjunction with FIGS. 3 and 4.

Figure 3:
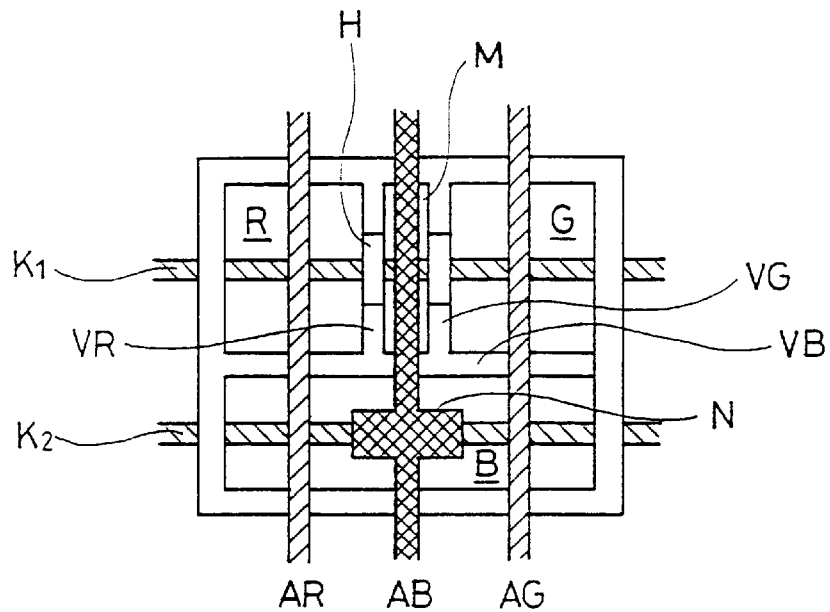
FIG. 3 is a plan view illustrating one pixel of the color PDP in accordance with the present invention.
Figure 4:
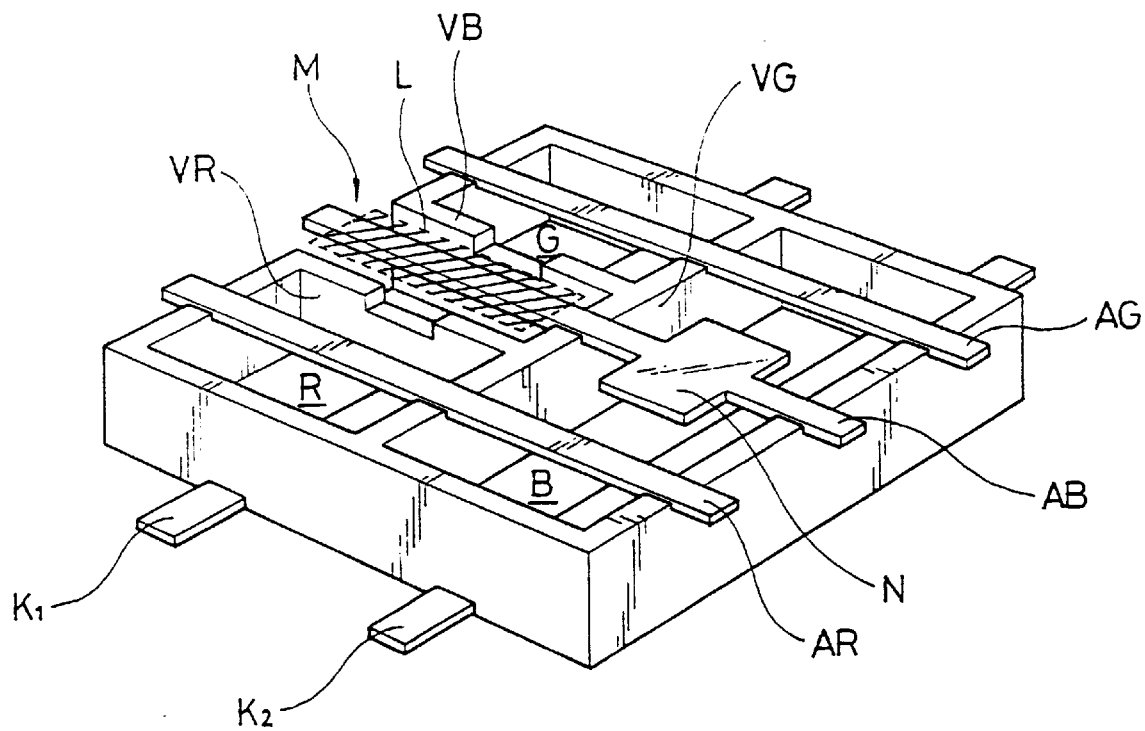
FIG. 4 is a perspective view illustrating one pixel of the color PDP in accordance with the present invention.

Referring to FIGS. 3 and 4, discharge cells R, G and B of one pixel are shown as being defined by partitions VR, VG and VB, respectively. Above the discharge cells R, G and B, anodes AR, AG and AB are disposed. Beneath the discharge cells R, G and B, cathodes $K_1$ and $K_2$ are disposed which cross the anodes AR, AG and AB in a matrix fashion.

The cathode $K_1$, which is one of the odd cathodes in the color PDP including a plurality of pixels each having the above-mentioned arrangement, extends transversely across the red and green discharge cells R and G. On the other hand, the cathode $K_2$, which is one of the even cathodes in the color PDP, extends only transversely across the blue discharge cell B.

The anodes AR, AG and AB are associated with three discharge cells R, G and B, respectively. The anodes AR and AG respectively associated with red and green discharge cells R and G extend perpendicularly across central portions of the red and green discharge cells R and G and then perpendicularly across both side portions of the blue discharge cell B, respectively. The anode AB associated with the blue discharge cell B extends between red and green discharge cells R and G and then perpendicularly across the central portion of blue discharge cell B.

Between red and green discharge cells R and G, an assistant cell M is defined by two partitions VR and VG. It is preferred that the anode AB extends perpendicularly across the assistant cell M. In a preferred operation of the color PDP in accordance with the present invention, the anode AB associated with the blue discharge cell B serves as an assistant electrode for red and green discharge cells R and G in addition to its own function. To this end, priming holes H are provided at the partitions VR and VG disposed on both sides of the assistant cell M, respectively. Through the priming holes H, priming particles generated when the anode AB associated with the blue discharge cell B acts as an assistant electrode are supplied to the discharge cells R and G, respectively.

Where at least one of red and green discharge cells R and G together with the blue discharge cell B are selected to be activated, a voltage higher than the primary discharge voltage is applied between the odd, upper cathode K and the anode AB of the blue discharge cell B. As a result, a discharge occurs between the cathode $K_1$ and the anode AB. During this discharge, an abnormal light emission may occur. In order to prevent an occurrence of such abnormal light emission, it is preferred that the upper surface of the assistant cell M is a light shield layer L made of, for example, a black insulating material. Also, it is preferred that the portions of the anodes AR, AG extending perpendicularly across the blue discharge cell B are coated with the insulating material.

In the above-mentioned structure, the blue discharge cell B cannot receive priming particles from the assistant cell M even though the priming particles are supplied to both red and green discharge cells R and G. It is also preferred that the anode AB is provided at a central portion thereof with a node N providing an increased electrode area. This is because the anode AB passes through the central portion of the blue discharge cell B which has a laterally elongated structure. With the above-mentioned structure of the anode AB, the blue discharge cell B can have an increased discharge area, thereby achieving a rapid and high-intensity discharge. Accordingly, it is possible to obtain a sufficient luminance.

Preferably, the color PDP having the above-mentioned arrangement in accordance with the present invention is driven by alternatingly selecting odd and even ones of the cathodes thereof. This will be described in conjunction with FIG. 5.

Figure 5:
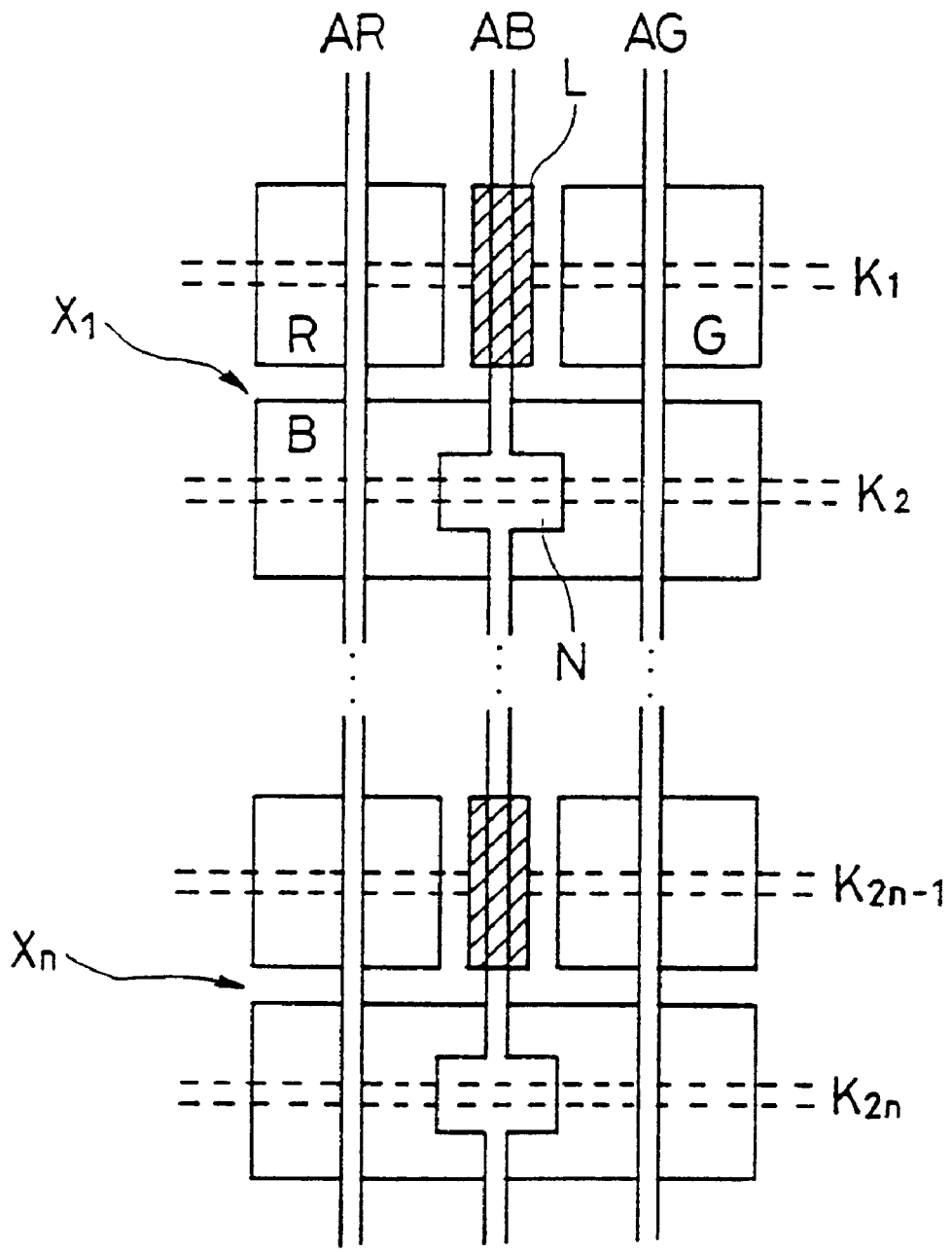
FIG. 5 is a schematic view illustrating a pixel matrix array of the color PDP in accordance with the present invention.

FIG. 5 shows only one column of pixels $X_1 \ldots X_n$ in the color PDP. In each pixel, three anodes AR, AG and AB respectively associated with discharge cells R, G and B cross a pair of odd and even cathodes which may be $K_{2n-1}$ and $K_{2n}$ for the pixel $X_n$.

Each red discharge cell R and each green discharge cell G are driven when each associated odd cathode, which may be $K_1$ for the pixel $X_1$ and $K_{2n-1}$ for the pixel $X_n$, is selected. In this case, the anode AB of each blue discharge cell B is used as an assistant electrode, thereby generating priming particles. These priming particles are migrated to red and green discharge cells R and G through priming holes H. As a result, a rapid discharge can be initiated with a low voltage upon writing data through anodes AR and AG respectively associated with the red and green discharge cells R and G.

On the other hand, each blue discharge cell B is driven when each associated even cathode, which may be $K_2$ for the pixel $X_1$ and $K_{2n}$ for the pixel $X_n$, is selected. In this case, a discharge occurs at each blue discharge cell B upon writing data through the anode AB associated with the blue discharge cell B, thereby causing the blue discharge cell B to emit light. Since each anode AB has the node N with an increased area, a sufficiently high discharge occurs at a high speed.

As apparent from the above description, the present invention provides a color PDP capable of easily adjusting a luminance difference among three kinds of discharge cells R, G and B, thereby achieving improvements in white balance and luminance.

Even when the color PDP of the present invention is applied to a high definition screen, the arrangement of constituting elements thereof can be avoided from being excessively dense because all electrodes are arranged in pixels associated therewith in the color PDP. In this case, it is possible to use each electrode as both data and assistant electrodes without providing any separate assistant electrode. Accordingly, the overall construction and driving can be simplified. Consequently, there is an effect of providing an inexpensive high definition color PDP.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

We claim:

1. A color plasma display panel including a pixel matrix array in which discharge cells of three colors, namely, red, green and blue, are grouped to constitute a pixel, an improved pixel comprising:

a first discharge cell adapted to emit light with one of the three colors, the first discharge cell having a height smaller than the entire height of the pixel and a width equal to the entire width of the pixel;

a pair of laterally arranged second discharge cells respectively adapted to emit light with the remaining two of the three colors, each of the second discharge cells having a height corresponding to a difference between the entire height of the pixel and the height of the first discharge cell and a width less than the entire width of the pixel;

an assistant cell disposed between the second discharge cells and having priming holes, said priming holes respectively provided at partition walls each disposed between each of the second discharge cells and the assistant cell;

a plurality of cathodes arranged in pairs for each row of the pixel matrix array, each odd one of the cathodes extending transversely across the second discharge cells in each cell of each associated pixel row and each even one of the cathodes extending transversely across the first discharge cell in each cell of each associated pixel row; and, a plurality of anodes arranged in groups of three for each column of the pixel matrix array, two side anodes of each anode group, respectively, extending perpendicularly across the second discharge cells and then perpendicularly across the first discharge cell in each cell of each associated pixel column, the remaining central anode of each anode group extending perpendicularly across the assistant discharge cell and then perpendicularly across the first discharge cell in each pixel of each associated pixel column, wherein the area of the anode located in the first discharge cell is much larger than the area of the anode located in the assistant cell.

2. The color plasma display panel in accordance with claim 1, wherein the assistant cell is covered with a light shield layer.

3. The color plasma display panel in accordance with claim 1, wherein the anode extending perpendicularly across the assistant cell is adapted to act as an assistant electrode upon selecting the odd cathodes and as a data electrode upon selecting the even cathodes.

* * * * *